Oct. 11, 1927.
C. F. KETTERING ET AL
1,644,731
INTERNAL COMBUSTION ENGINE
Filed April 17, 1922    13 Sheets-Sheet 7
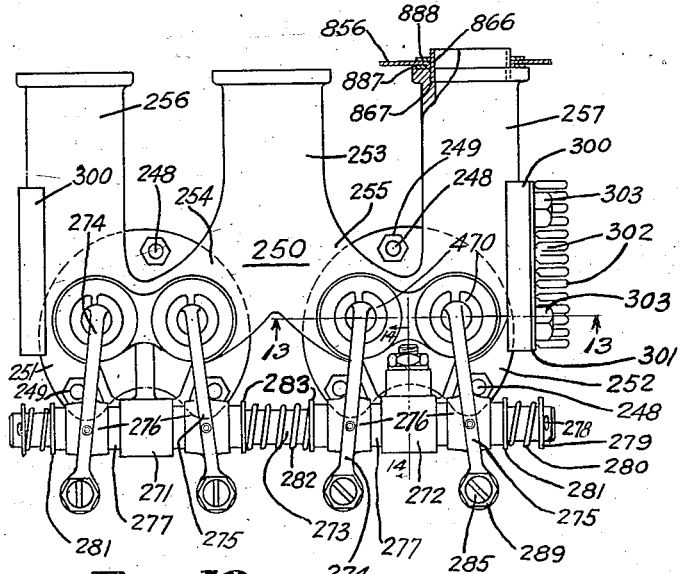
Fig. 12.
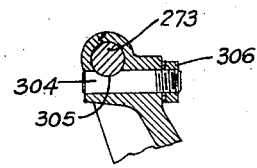
Fig. 14.
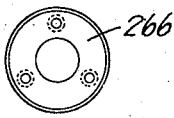
Fig. 15.
Fig. 16.
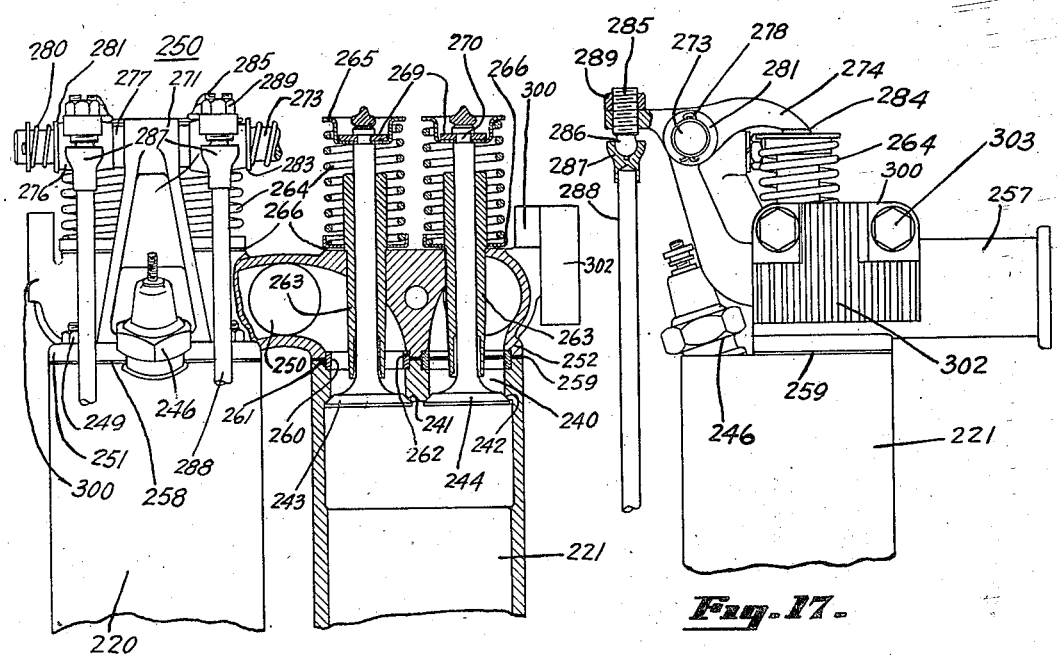
Fig. 13.
Fig. 17.
Witnesses
Walter W. Riedel
Geo. E. Favor
Inventors
Charles C. Short
Charles F. Kettering
By Francis P. Hardesty Attorney Oct. 11, 1927. 1,644,731

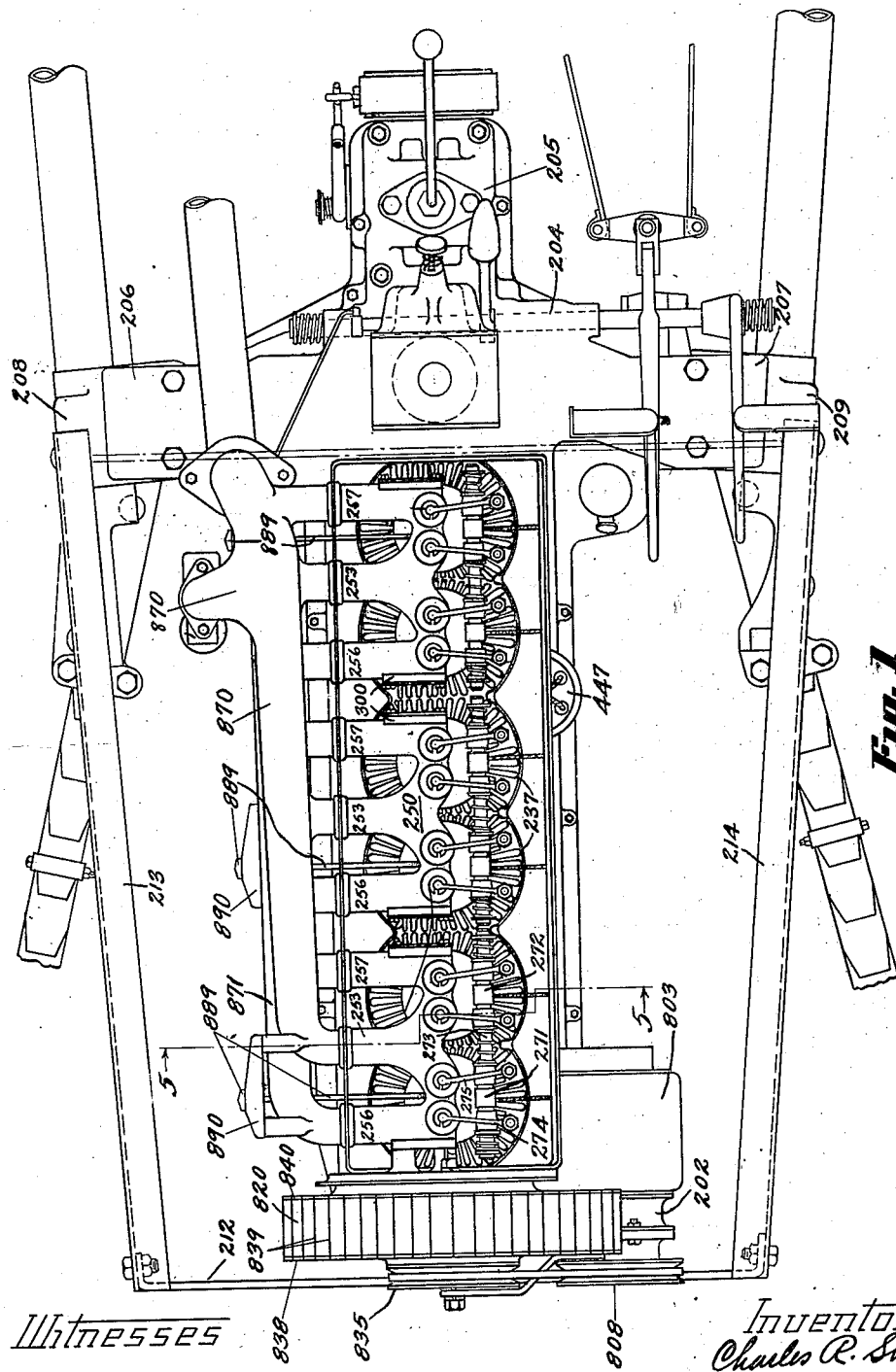

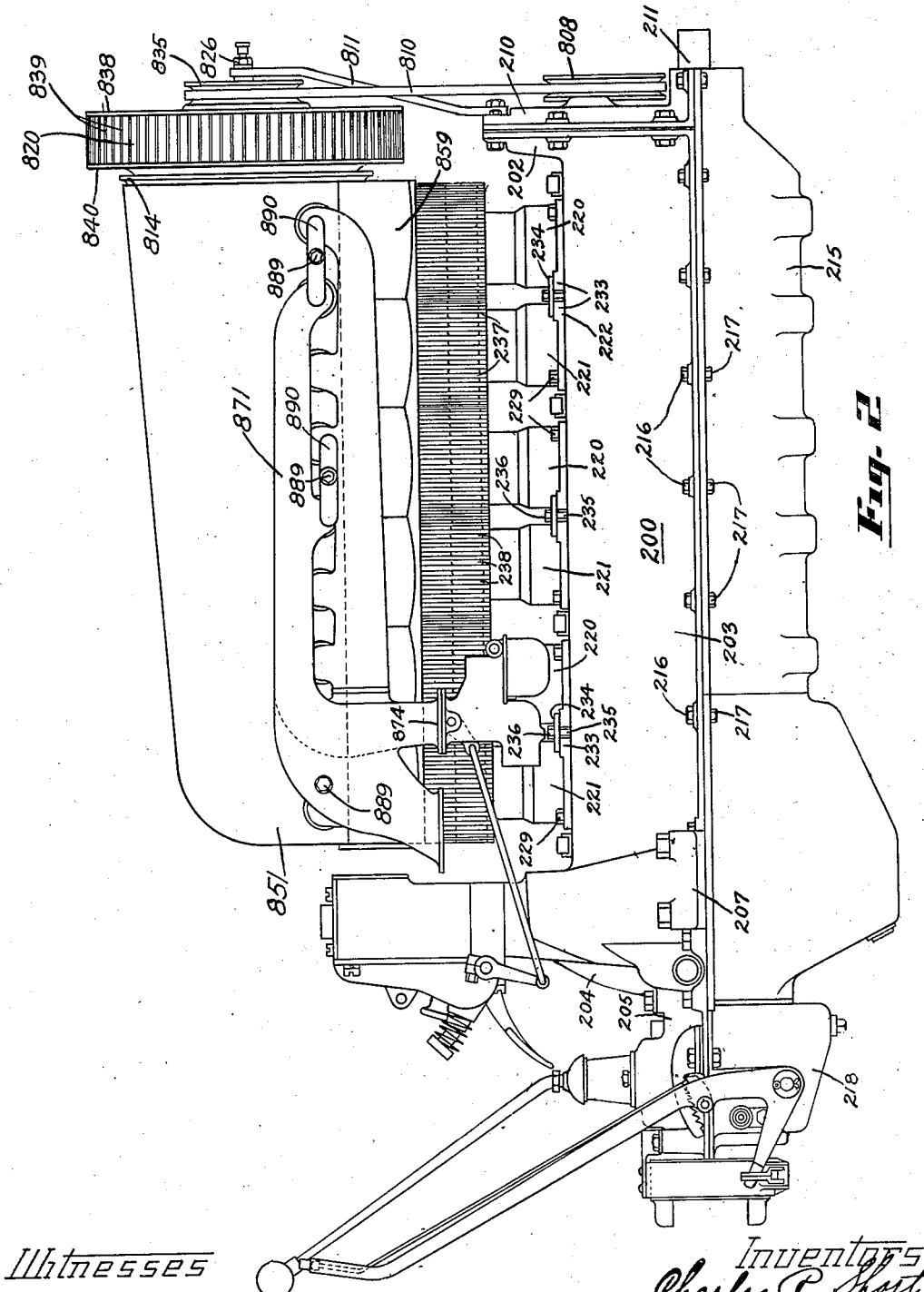

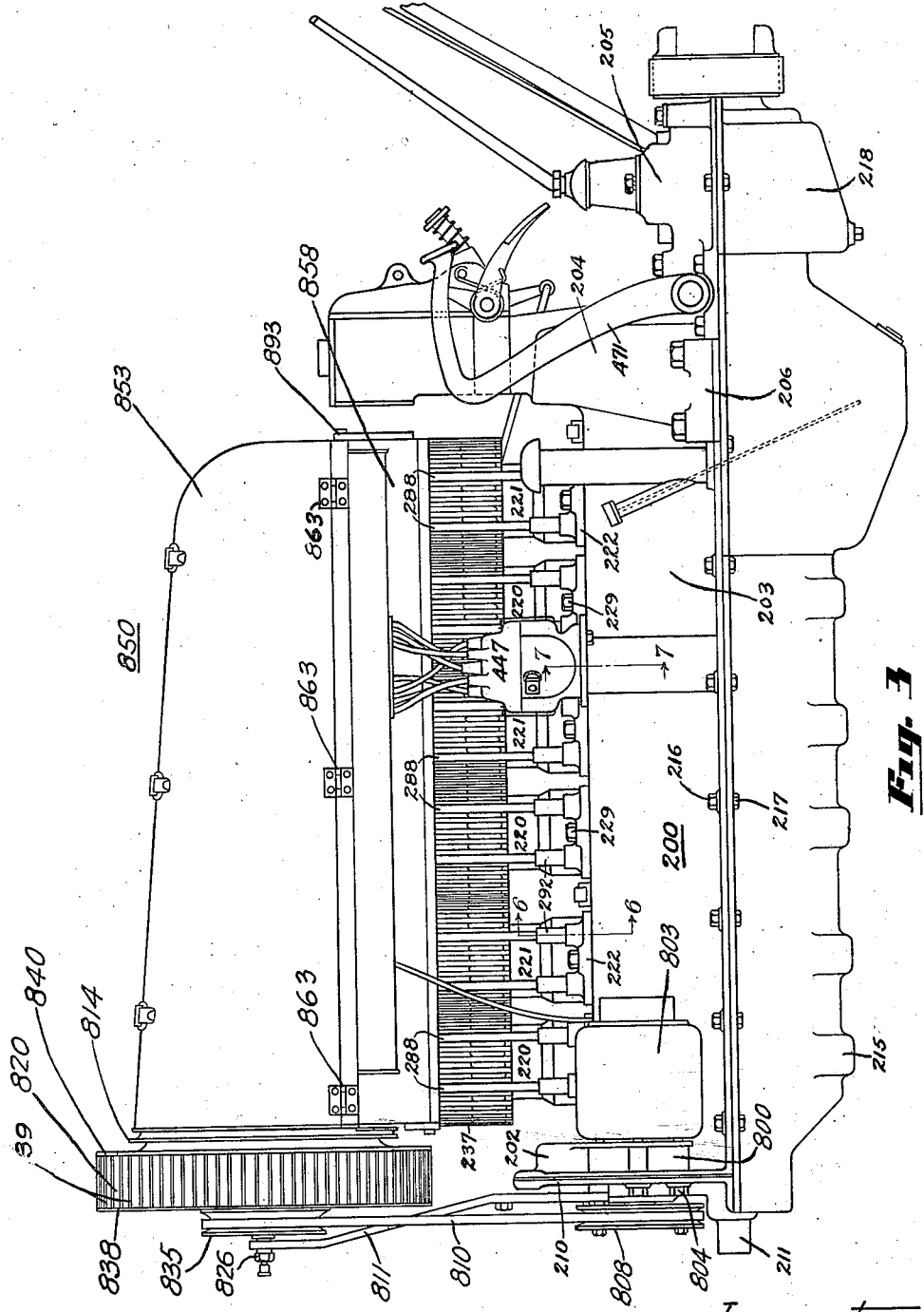

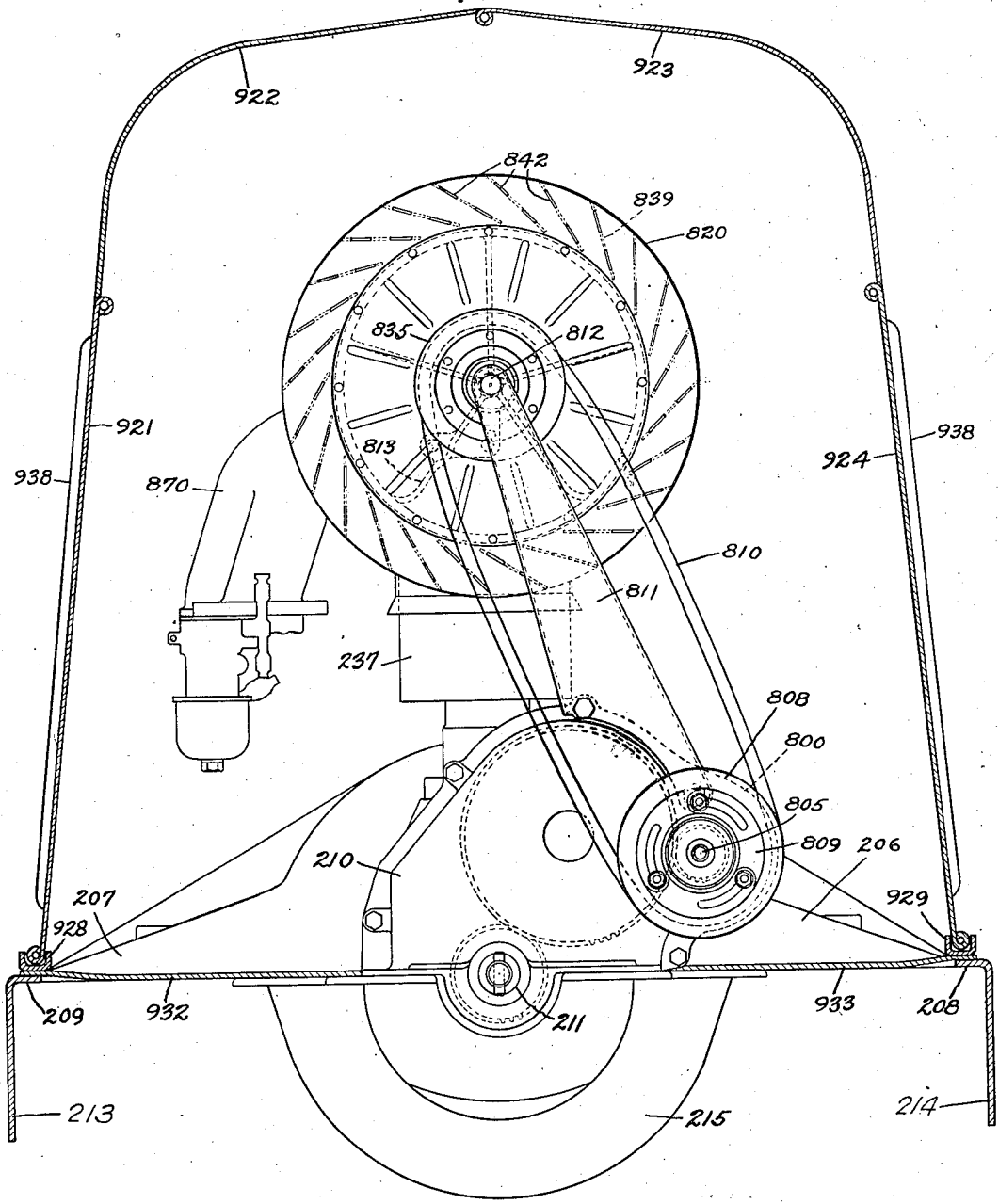

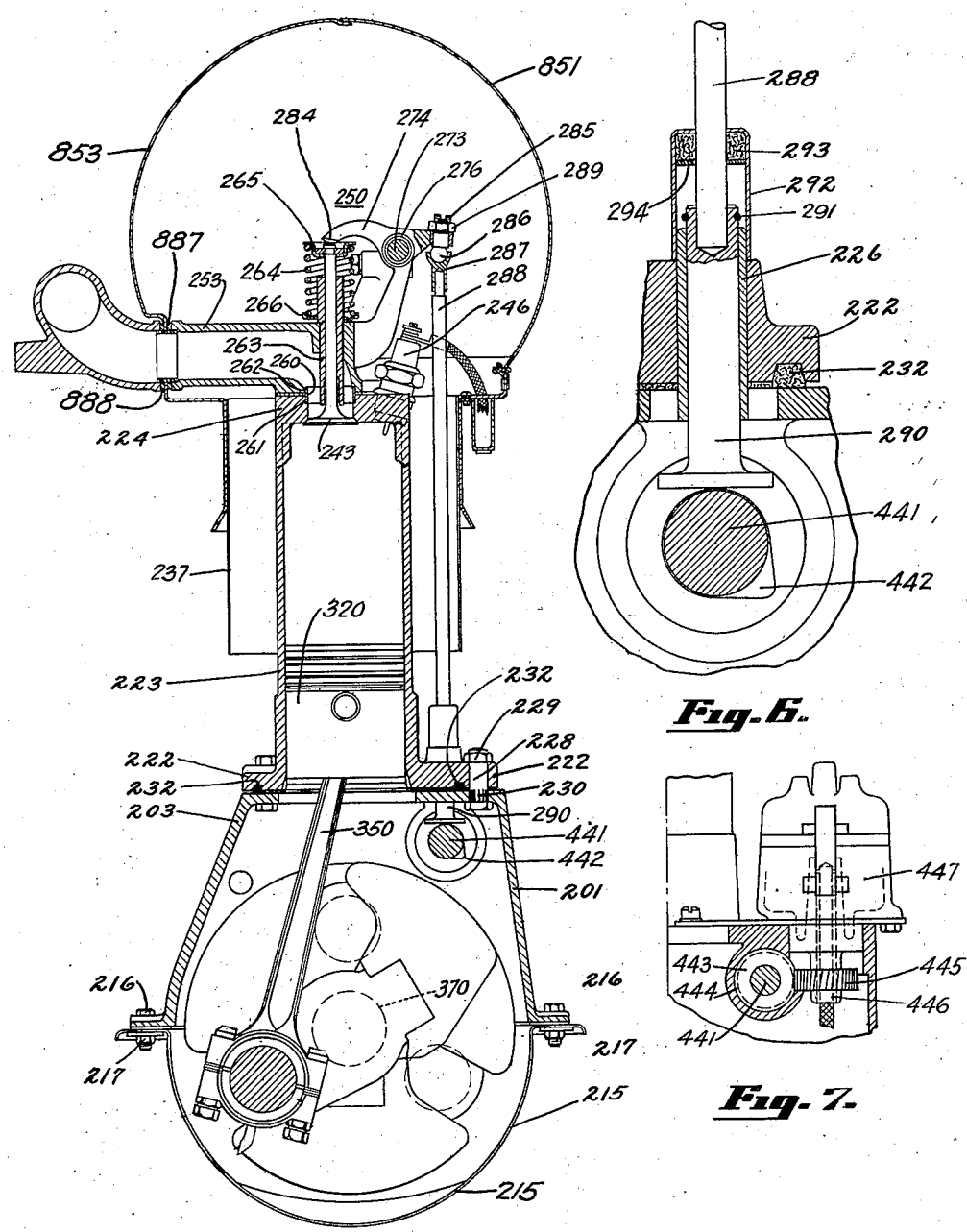

C. F. KETTERING, ET AL
INTERNAL COMBUSTION ENGINE
Filed April 17, 1922   13 Sheets-Sheet 9

Witnesses
Walter W. Riedel
Geo. C. Pasco.

Inventors
Charles P. Short
Charles F. Kettering
By Francis D. Hardesty
Attorney

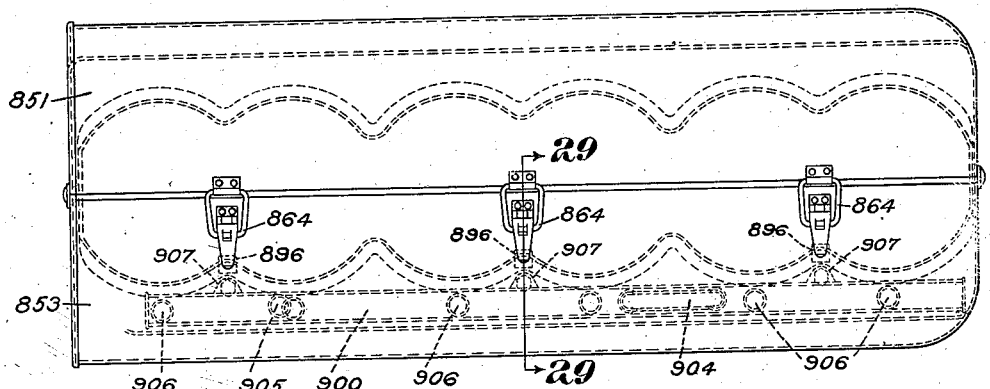
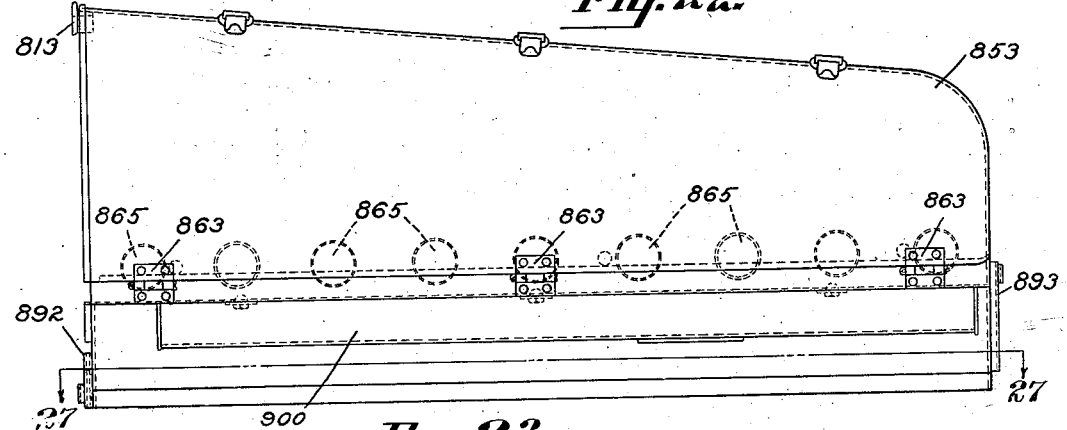
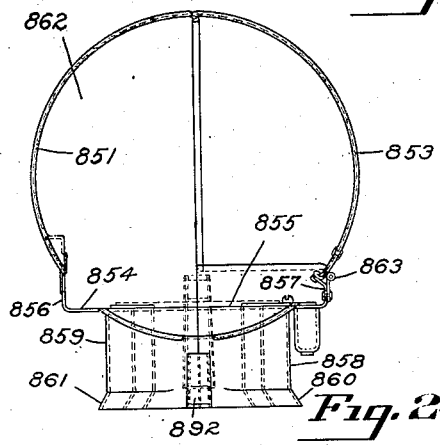
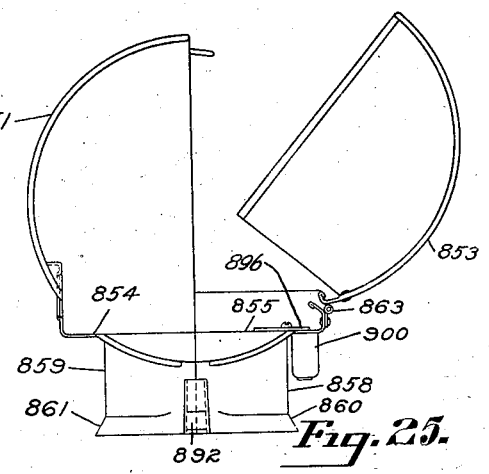

Oct. 11, 1927. 1,644,731

C. F. KETTERING ET AL

INTERNAL COMBUSTION ENGINE

Filed April 17, 1922   13 Sheets-Sheet 11

Witnesses
Walter W. Riedel
Geo. E. Pasco.

Inventors
Charles A. Short
Charles F. Kettering
By Francis P. Hardesty Attorney

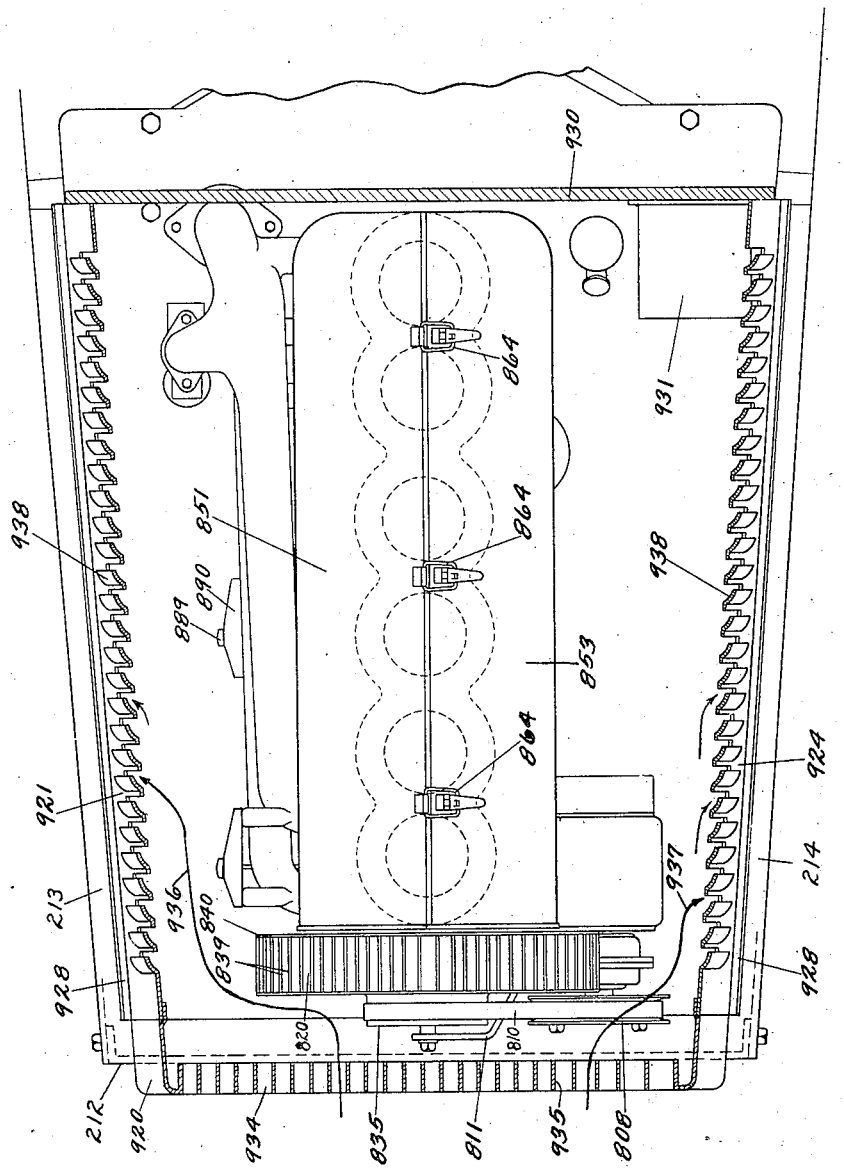

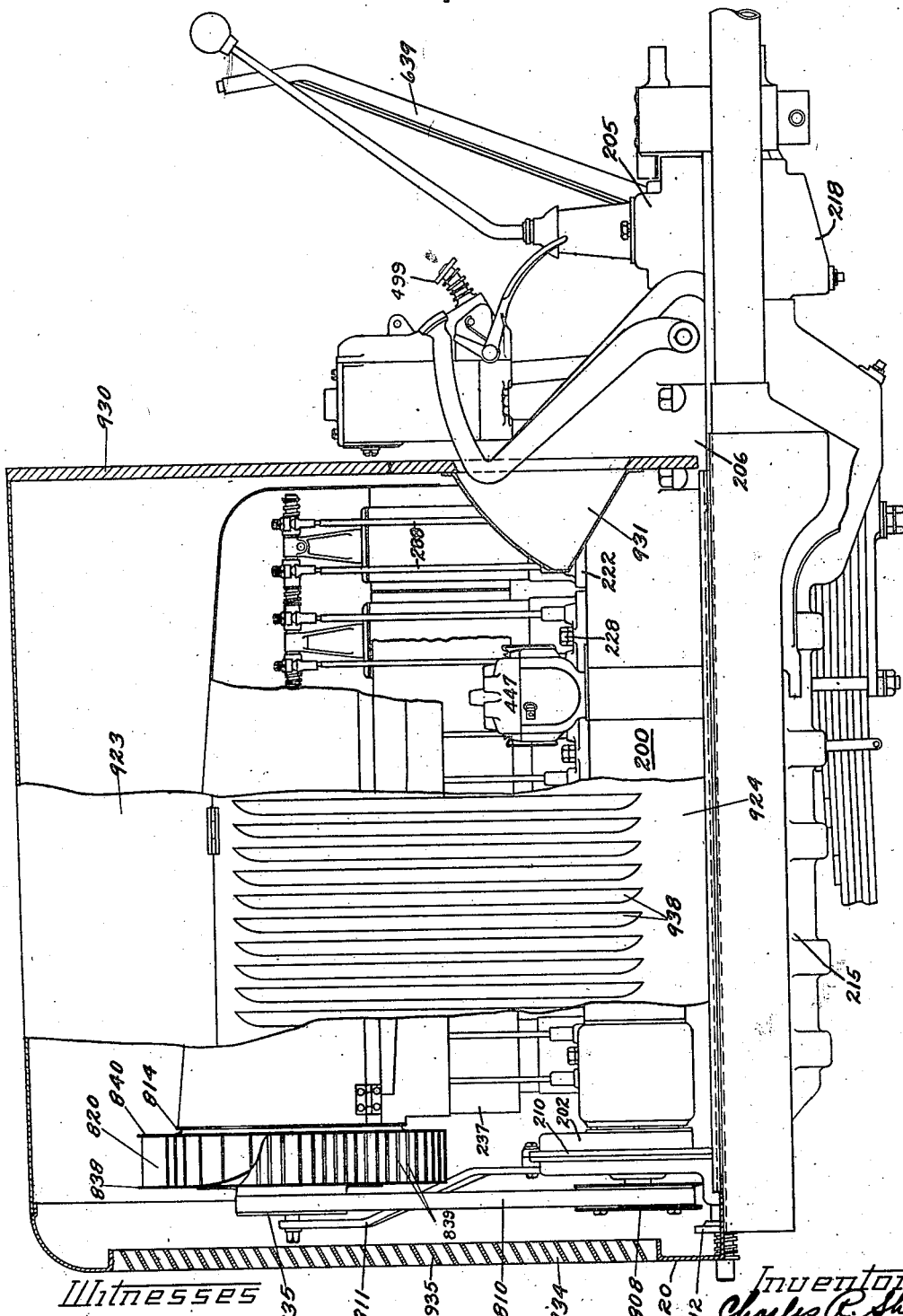

Patented Oct. 11, 1927.

1,644,731

UNITED STATES PATENT OFFICE.

CHARLES F. KETTERING AND CHARLES R. SHORT, OF DAYTON, OHIO, ASSIGNORS TO GENERAL MOTORS RESEARCH CORPORATION, OF DAYTON, OHIO, A CORPORATION OF DELAWARE.

INTERNAL-COMBUSTION ENGINE.

Application filed April 17, 1922. Serial No. 553,938.

This invention relates to internal combustion engines and its principal objects are to provide a light construction having high engine efficiency, accessibility to the engine parts and low initial and upkeep costs.

These objects are attained generally by the form and construction of the parts employed by the placing and grouping of these parts, and by employing an air cooled cylinder provided with fins which dissipate the heat rapidly.

In the drawings:

Fig. 1 is a plan view of a power unit constituting a preferred embodiment of the present invention with the hood and top of the draft tube removed;

Fig. 2 is a right side elevation thereof;

Fig. 3 is a left side elevation;

Fig. 4 is a front end elevation of the power unit with the front end portion of the hood removed;

Fig. 5 is a transverse sectional view of the power unit taken substantially on the line 5—5 of Fig. 1;

Fig. 6 is a sectional view taken substantially on the line 6—6 of Fig. 3 and showing a portion of the valve operating mechanism;

Fig. 7 is a side view of the ignition unit showing a portion of the crank case and driving mechanism for the unit in section, the section being taken substantially on the line 7—7 of Fig. 3;

Fig. 12 is a plan view of one of the engine superstructures;

Fig. 13 is a side elevation of an engine superstructure mounted upon two adjacent engine cylinders, (the fins are not shown) certain parts of the superstructure and cylinder being shown in section, the section being taken on the line 13—13 of Fig. 12;

Fig. 14 is a fragmentary sectional view taken on the line 14—14 of Fig. 12;

Figs. 15 and 16 are plan and side views, respectively, of a spring cup;

Fig. 17 is an end elevation showing a superstructure and one of the engine cylinders, the fins on the cylinder being omitted;

Fig. 22 is a plan view of the draft tube assembly;

Fig. 23 is a left side elevation thereof;

Fig. 24 is a front end view thereof;

Fig. 25 is a view similar to Fig. 24 but showing the hinged portion of the draft tube in partly open position;

Fig. 30 is a plan view of the engine, the engine hood being shown in section;

Fig. 31 is a left side elevation of the power unit with the hood shown partly in side elevation and partly in section, certain parts of the engine being shown in section in order to show the engine cooling system.

Figure 8:
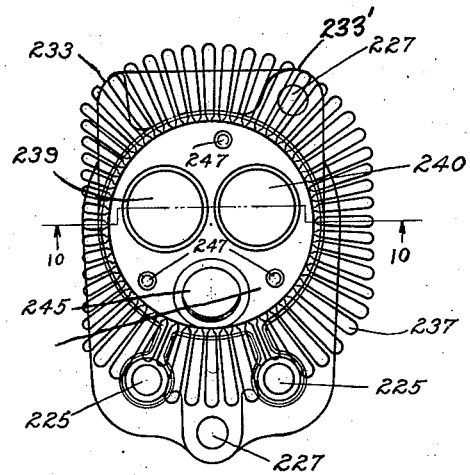
Fig. 8 is a top view of an engine cylinder.

Introduction.

The engine illustrated in the drawings is designated as a whole by the numeral 200 and in the description which follows this power unit is described as comprising several organisms which cooperate to form a relatively simple and efficient mechanism having advantages which shall appear hereinafter. To facilitate an understanding of the engine mechanism the description thereof, so far as the same is described herein and claimed in this present application, is divided into the following parts: Crankcase general construction, Cylinder construction and valve mechanism, and Cooling system.

*Crank case general construction.*

A crank case construction is provided which is relatively light, maintains alignment of the different engine parts and can be manufactured at relatively low cost. These results are obtained by so forming the parts that a one piece supporting member or engine frame may be employed as the upper housing member, and the power unit may be disassembled by removing separately relatively light and substantially complete clutch and transmission units. The forming of the upper and lower housing members for the clutch and gear mechanisms, so these members may be separated along the axes of the main shafts, assists materially in obtaining these results. The construction however is not wholly limited to the use of a one piece supporting member for all the parts.

The power unit (see particularly Figs. 1, 2, and 3) includes a one piece main supporting member in the form of a crank case 200 extending substantially the full length of the power unit and comprising an integral timing gear housing 202, crank shaft housing 203, flywheel housing 204, and a housing 205 forming the upper half of the transmission case. Crank case 200 is provided with laterally extending supports or arms 206 and 207 which rest upon spring brackets 208 and 209, respectively. These spring brackets are a part of the automobile chassis described and claimed in the copending application of Charles F. Kettering and Charles R. Short, Serial No. 553,075, filed April 15, 1922. Timing gear housing 202 is closed by timing gear housing cover 210 provided at its lower end with a forwardly extending cylindrical engine support 211 which projects into a hole provided in front cross member 212 connecting side frame members 213 and 214. Members 206, 207 and 211 form a three point support for the power unit. This construction provides forwardly projecting frame members secured to the main chassis frame and is particularly adapted for air cooled engines, because of their light weight. The center of gravity of the power unit is close to the lateral engine supports 208 and 209. Crank case 200 supports oil pan 215 secured to the crank case by means of bolts 216 and nuts 217. Crank case 200 supports the lower portion 218 of the change speed gear or transmission housing which lower portion cooperates with the crank case portion 205 to provide an enclosure for the change speed mechanism. The oil pan 215, front wall of gear box 218, and portion 203 of the crank case form an enclosure for the crank shaft, cam shaft and other mechanism connected therewith.

*Cylinder construction and valve mechanism.*

Figure 10:
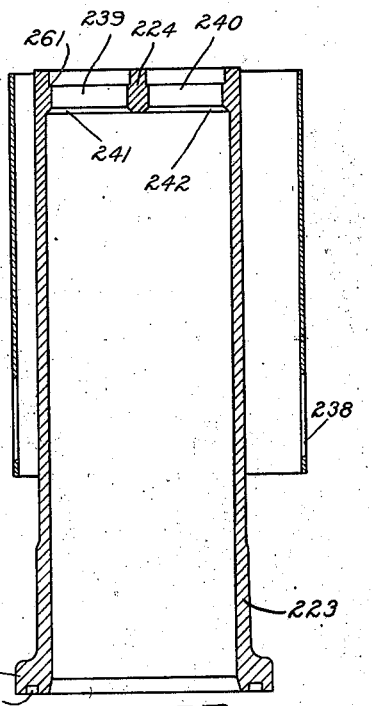
Fig. 10 is a sectional view taken on the line 10—10 of Fig. 8.
Figure 9:
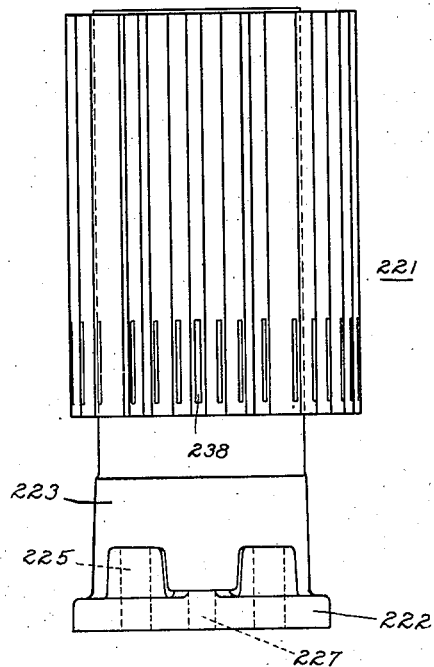
Fig. 9 is a side elevation thereof.
Figure 11:
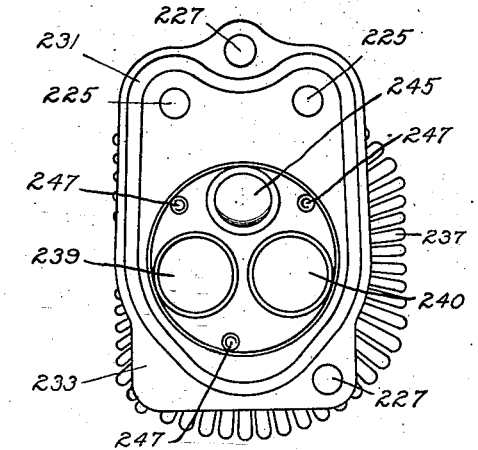
Fig. 11 is a bottom view of the engine cylinder.

Crank case 200 supports six cylinders arranged in pairs, each pair consisting of cylinders 220 and 221. One of the cylinders 221 is shown in detail in Figs. 8 to 11 inclusive. The cylinder 221 includes a horizontal base portion 222, a relatively thin vertical shell portion 223 and a thicker head portion 224 (Fig. 10). The base portion 222 is formed with openings 225 to receive valve lifter guide bushings 226, and with holes 227 through which bolts 228 carrying nuts 229 may extend for securing the cylinder to the crank case. The bolts 228 are provided with a knurled portion 230 which has a pressed fit in the crank case to retain the bolts in position when the nuts 229 are removed. 231 is an endless groove tapered in cross-section in the lower face of the base to receive a resilient packing washer 232 (formed of felt or oil resisting cement coated rubber tubing) to render the joint between the cylinder base and crank case oil tight.

Each cylinder base is formed with two similar parallel bosses 233, 233' projecting from one side of the cylinder. One of the bosses 233' is apertured to receive a bolt 228. When all of the cylinders are located upon the crank case, these bosses 233 and 233' will be arranged in pairs. By this construction all of the cylinders may be cast or otherwise formed alike and a hole 227 bored in but one of the bosses on each cylinder thus reducing the cost of manufacture. A clamp 234 (Fig. 2) bears downwardly against adjacent solid bosses 233 and is secured in position by means of a bolt 235 and a nut 236, the bolt 235 having a press fit in the crank case after the manner of the bolt 228. A single bolt 228 is employed to tie the opposite side of each cylinder to the crank case.

The cylinder shell 223 has a cylindrical outer surface to which are attached a plurality of fin loops 237 which are preferably constructed of a continuous strip of thin relatively pure copper or other material of high heat conductivity. The method and apparatus for constructing these fins are described and claimed in U. S. Letters Patent, No. 1,507,318, issued upon September 2, 1924, to Charles L. Lee, and the manner of attaching the fins to a cylinder is described and claimed in the copending application of Charles F. Kettering, Serial No. 514,014, filed November 9, 1921. For purpose of this specification it is sufficient to say that these fins are attached in such a manner that there is substantially true thermal contact between the material of the cylinder shell and the fins, as contrasted with a form of attachment in which the fins are secured to the cylinder by mechanical means. The bond between the fin metal and the cylinder shell is a permanent one which will not deteriorate through use of the cylinder, and the fins will be securely fastened to the cylinder shell at temperatures in excess of those reached during normal operation of the motor.

It has been found that by using heat dissipating fins made of copper or other material having a relatively high coefficient of heat conductivity the cooling capacity of the lateral fins is sufficient to cool the cylinder heads and walls readily and the heads are made relatively thick to provide a large heat channel for conducting the heat in the cylinder heads readily to the lateral fins to reduce to a minimum the differences in temperature in the piston head and avoid the formation of hot spots. This construction avoids the cost and structural complications involved in forming fins on the tops of the cylinders.

Figure 18:
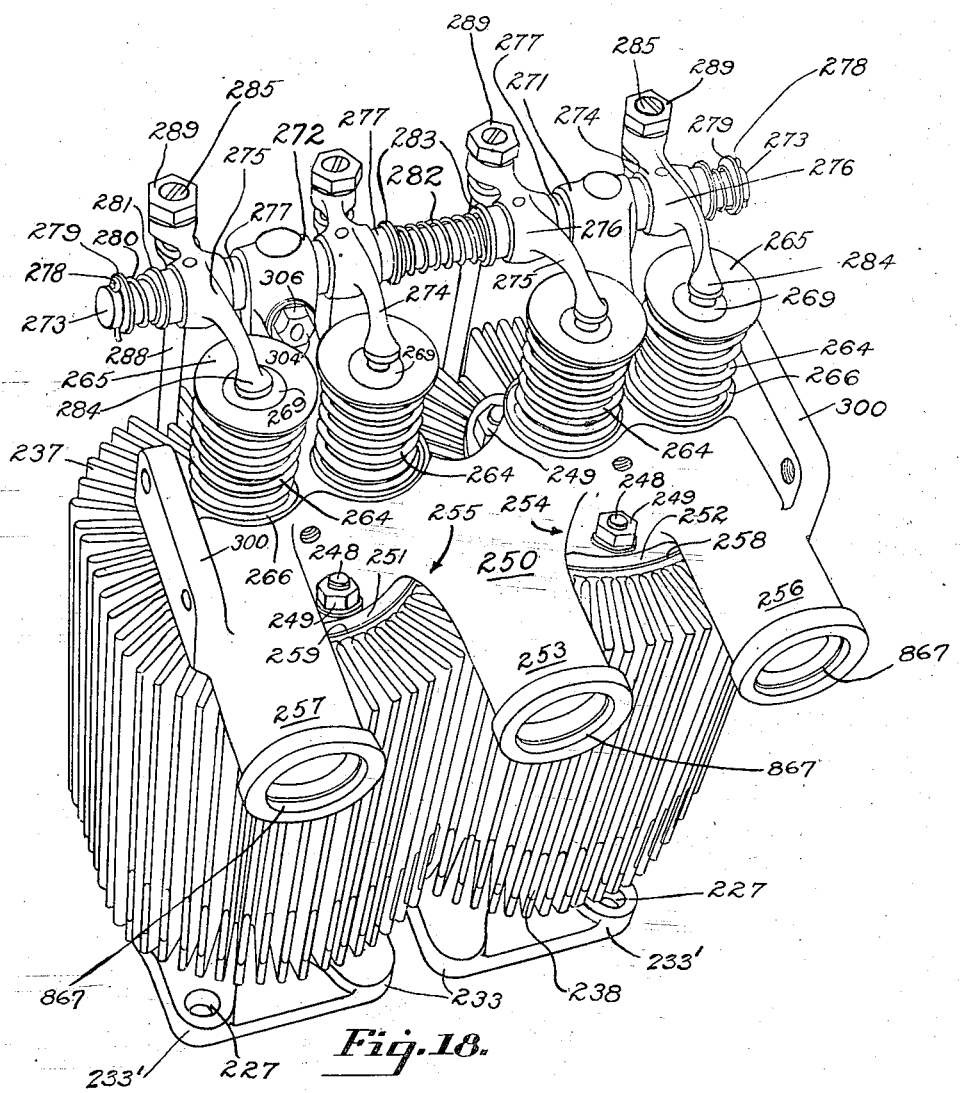
Fig. 18 is a perspective view showing a pair of engine cylinders to which the superstructure is attached and showing parts of the valve mechanism.

The fins are not all of equal height, those on the left-hand side of the cylinder, as viewed in Fig. 8, being shorter than those surrounding other portions of the cylinder shell and the fins on the right-hand side of the cylinder being flattened slightly. This arrangement of the finning permits a close grouping of all of the cylinders and facilitates the placing of the cylinders in pairs as shown in Figs. 1 and 18 with a single intake pipe or a pair of cylinders. This arrangement of finned cylinders is more particularly described and claimed in the copending application of Charles F. Kettering, Serial No. 514,014, filed November 9, 1921. The fin loops adjacent the holes 225 are relatively short to provide a clearance for the valve push rods. As the cooling draft enters the lower ends of the fin loops the closely grouped fin walls act to some extent as a dust strainer or separator and remove a part of the dust carried by the air currents employed in cooling. The lower ends of the fin loops are provided with vertical slots 238 to permit cleaning dust and other foreign material from the inside of the loops by means of a narrow brush whose bristles project through the slots.

Each cylinder head 224 is provided with intake and exhaust ports 239 and 240, respectively, and the inner surface of the cylinder head surrounding these ports is beveled as shown at 241 and 242, respectively, to provide seats for intake and exhaust valves 243 and 244. Each head 224 is also provided with a hole 245 for receiving a spark plug 246 and with holes 247 to receive studs 248 cooperating with nuts 249 for securing a cylinder superstructure to a pair of cylinders.

The cylinder superstructure designated as a whole by numeral 250, (see particularly Figs. 12 to 18 inclusive), joins the heads of each pair of cylinders 220 and 221 and is provided with two kidney shaped bases 251 and 252 which are detachably secured by means of the studs 248 and nuts 249 upon the cylinder heads. This construction is not wholly limited to the use of bolts for it is within the scope of the invention to permanently fasten the superstructure in place by rivets. The superstructure 250 includes a common intake 253 for a pair of cylinders, the intake having branches 254 and 255 communicating with the intake ports of cylinders 220 and 221. 256 and 257 are exhaust conduits communicating respectively with the exhaust ports of cylinders 220 and 221. The joints between the superstructure bases 251 and 252 and the cylinders 220 and 221 are sealed by kidney shaped gaskets 258 and 259. These gaskets are preferably constructed of a material such as asbestos having a low heat conductivity to insulate the superstructure and more particularly the exhaust conduits from the cylinder heads and reduce the quantity of heat to be removed from the heads by the cooling fins. A large mass of metal may be employed between the intake and exhaust conduits (see Fig. 13) to reduce the temperature of the exhaust pipe by the cooler fluids passing through the intake pipe. This promotes the life of the valve guides and springs which are heated by the exhaust pipe. The passages in the cylinder heads and superstructure are accurately aligned by means of short dowel sleeves 260 seated within counterbored recesses 261 in the cylinder head and counterbored recesses 262 in the superstructure. This construction holds the heads of a pair of cylinders in alignment and promotes rigidity in the structure.

Superstructure 250 is bored to receive valve stem guides 263 for guiding the intake and exhaust valves. These guides are pressed into the superstructure. Each valve is normally retained against its seat by a coiled spring 264 bearing at its upper end against a spring retainer cup 265 and at its lower end against a spring rest 266. As shown in Figs. 15 and 16, each spring rest 266 is made of sheet metal and is provided with three projections or feet 267, formed preferably by embossing. These feet space the body of each spring rest 266 and the lower end of a spring 264 from the upper surface of the superstructure, give a small area of contact between a rest and the superstructure and provide a channel for cooling air, thus reducing to a minimum the heat transmitted to the spring and promoting the life of the latter. The spring retaining cup 265 is held in position by a U-washer 269 seated in a groove 270 in the upper end of the valve stem. The superstructure includes vertical rocker shaft brackets 271 and 272 supporting a horizontal rocker shaft 273 carrying transverse rockers 274 and 275. Each of these rockers has a hub 276 carrying a suitable bushing 277 between a rocker and the rocker shaft. Each end of the rocker shaft carries a pin 278 forming an abutment for a thrust washer 279. A compression spring 280 bears against lock washer 279 and a washer 281 positioned adjacent the bushing 277 and yieldingly presses the outside rockers toward the rocker brackets 271 and 272. A spring 282 presses against washers 283 and thus yieldingly forces adjacent inner rockers 274 and 275 against the rocker brackets 271 and 272. These springs reduce noise during the operation of the valve mechanism. Each rocker is provided at its inner end with a foot 284 which engages the upper end of a valve stem and the opposite end of the rocker is provided with a tapped hole for receiving a screw 285 provided at its lower end with a ball portion 286 seated in a socket formed in the top of a push rod cap 287 which is supported by a push rod 288. Screw 285 is retained in adjusted position by nut 289.

The lower end of push rod 288 rests upon a valve lifter 290 provided near its upper end with a circumferential groove for receiving a wire split ring 291. This ring holds the valve lifter in place in the cylinder base when the valve lifter is separated from the cam shaft. The upper portion of guide 226 projecting above the base 222 of the cylinder is enclosed by a packing cap 292 containing a felt packing ring 293 which surrounds the push rod 288. This packing ring is held in place by a metal washer 294 pressed into the cap 292.

Exhaust conduits of the superstructure may be provided with a pad 300 for receiving a heat radiating member including a main plate 301 preferably of copper, to which are attached a series of folds 302 made of copper or other material which dissipates heat rapidly. This member is attached to the pad 300 by means of screws 303, these pads having been previously machined to assist in providing a good mechanical contact between the superstructure and the heat dissipating member for conducting heat to the latter.

As is shown more clearly in Fig. 14, the rocker shaft 273 is held in a fixed position on the superstructure by a bolt 304 having an arcuate notch 305 whose curved surface is pressed against the surface of the rocker shaft 273 by turning the nut 306 on the end of bolt 304.

Within each cylinder is a piston 320 not herein disclosed in detail, as the same forms no part of the invention to which this present application relates; said pistons being connected with the crank arms of the crank shaft 370 of the engine, which is not described in detail, through piston rods 350. The crank shaft is supported in suitable bearings by the crank case 200. The crank shaft carries a pinion which meshes with a gear to thereby drive the cam shaft 441 at the usual two-to-one ratio; said cam shaft being supported in bearings carried also by the crank case 200, and having cams 442 which engage the valve lifters 290 and thus operate the valves. An intermediate journal 443 of the cam shaft 441 has a pinion 444 formed therein which meshes with a gear 445 carried by the lower end of the driving shaft 446 of the distributor and timer mechanism 447, which controls the ignition circuits of the several cylinders. The elements and features herein mentioned are or may be of common or ordinary form, and need not be described at length in order that the features wherein our invention consists may be appreciated.

*Cooling system.*

Figure 19:
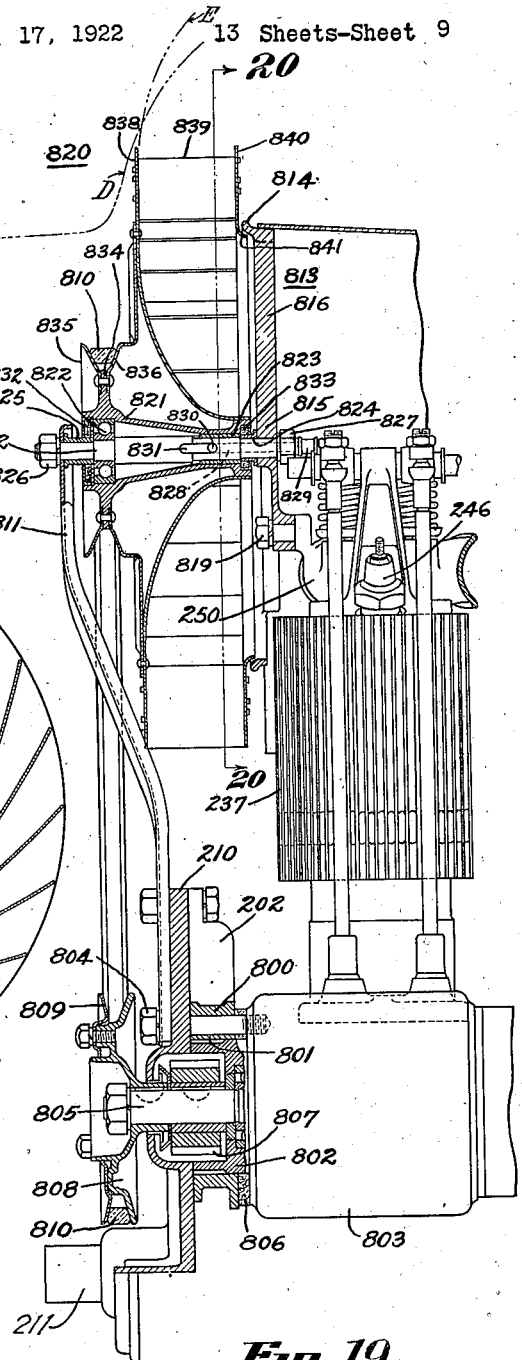
Fig. 19 is a longitudinal sectional view of the fan mechanism, the front engine cylinder being shown in side elevation.
Figure 27:
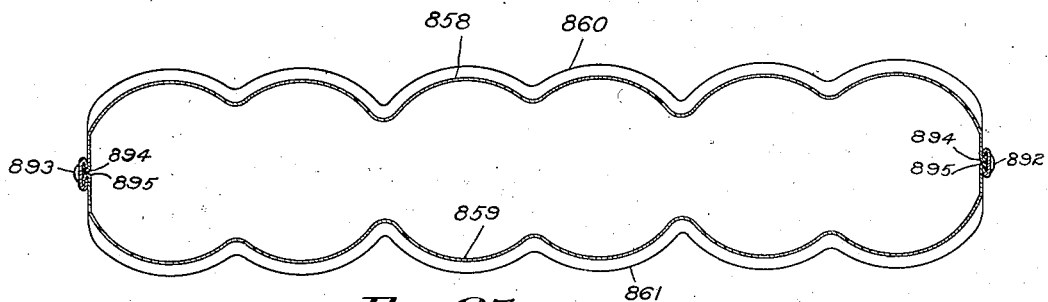
Fig. 27 is a longitudinal sectional view of the draft tube taken on the line 27—27 of Fig. 23.
Figure 28:
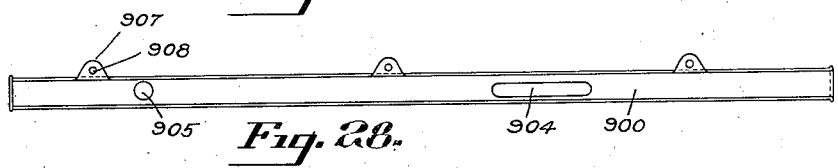
Fig. 28 is a plan view of the wire manifold forming a part of the draft tube.
Figure 29:
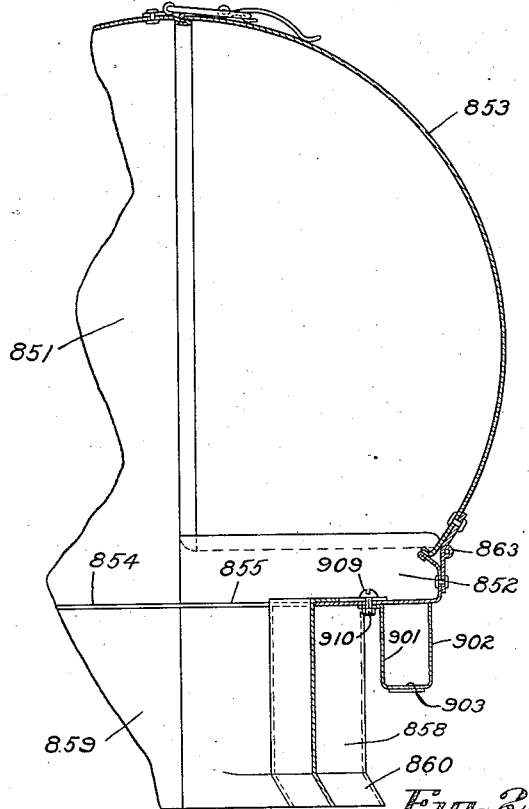
Fig. 29 is a partial transverse sectional view of the draft tube taken on the line 29—29 of Fig. 22 on an enlarged scale.
Figure 26:
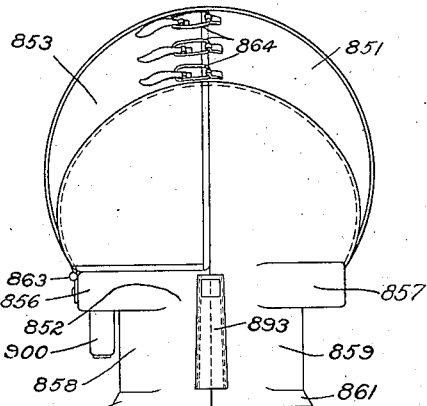
Fig. 26 is a rear end elevation of the draft tube.

The timing gear housing 202 has an arm 800 (Figs. 3, 4 and 19) projecting laterally from the left-hand side of the engine, which arm is bored out at 801 to receive an annular flange 802 provided on the frame of generator 803. A part of the bolts 804 which secure the timing gear case cover 210 to timing gear case 202 also function to hold generator 803 against the rear side of arm 800. If desired the rear surface of arm 800 need not be machined as the correct alignment of the shaft 805 of generator 803 is provided for by the cooperation of the machined surface 801 with the machined surface of the flange 802. A felt ring 806 assists in sealing the joint between the generator frame 803 and the arm 800.

Shaft 805 carries generator gear 807 and a fan driving pulley 808 having an adjustable flange 809 which may be operated in a well known manner to tighten or loosen the fan belt 810, the belt being preferably of such type as will give high efficiency without being drawn taut on the pulley wheels as in prior practice, thus reducing the pressure of the shaft journals on their bearings and the power required to drive the fan. The power required for driving the fan is also reduced by employing a fan of the peripheral discharge type having a large intake and discharge throat which will give the fan a large capacity, the air being thrown out radially at a relatively low velocity.

Timing gear case cover 210 supports a vertical fan shaft bracket 811 supporting at its upper end the outer portion of fan shaft 812 whose inner end is supported by fan spider 813. Spider 813 comprises a peripheral flange 814 and a hub 815 carrying the shaft 812. The hub 815 and flange 814 are joined by a plurality of radial arms 816

Figure 20:
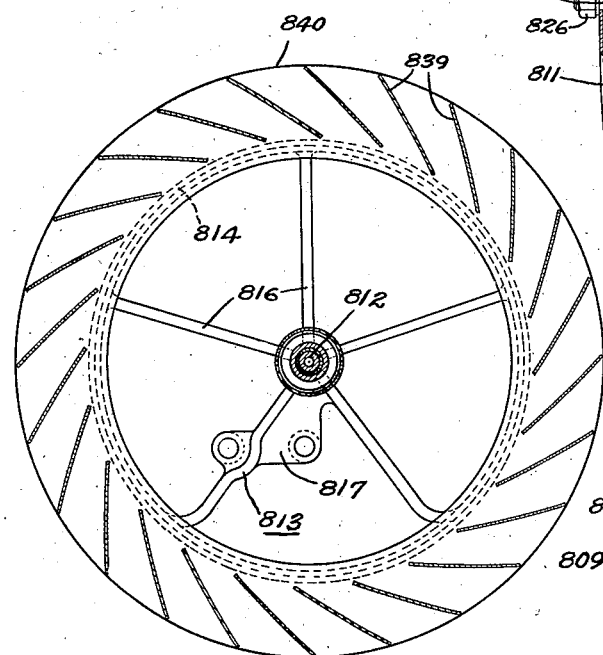
Fig. 20 is a transverse sectional view of the fan taken on the line 20—20 of Fig. 19.

(Fig. 20) of which a part are formed with a web 817 fastened to the front superstructure 250 by bolts 819.

The fan designated as a whole by numeral 820 (Figs. 19 and 20) includes a hub 821 journalled on the shaft 812 by means of an outer ball bearing 822 and an inner plain bearing 823. Between bearing 823 and spider 815 is a spacing sleeve 824 and between bearing 822 and fan bracket 811 is a second spacing sleeve 825. The forward end of shaft 812 is threaded to receive nut 826 and the rear end is threaded to receive nut 827. By tightening the nuts 826 and 827, the members 825, 821, 823, and 824 will be secured in operative position between the bracket 811 and the spider 813. The rear end of shaft 812 is bored axially for a short distance to provide an oil duct 828. An oiling cup 829, attached to the rear end of this shaft, is in communication with this duct. Oil flows from the duct 828 through a hole 830 to the bearing 823 and also down a groove 831 into the interior of hub 821 to the ball bearing 822. Dust excluding and oil retaining washers 832 and 833 are provided.

Figure 21:
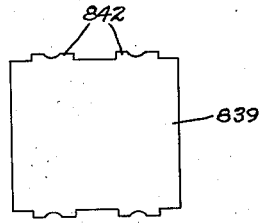
Fig. 21 is a plan view of one of the fan blades.

Hub 821 is formed with a radial flange 834 to which are riveted fan pulley outer flange 835 and fan pulley inner flange 836. These flanges cooperate to provide a pulley driven by the belt 810. Pulley inner flange 836 carries fan outer wall 838 which is formed with an inwardly projecting, central, conical portion resting on the hub 821 and functions to deflect air toward the periphery of the fan. Fan outer wall 838 supports a plurality of fan blades 839 which in turn support fan inner wall 840 having a rearwardly extending annular flange 841 extending within spider flange 814. These fan blades are constructed preferably of duralumin to reduce the load on the belt and each blade is provided with a plurality of lateral ears 842 (Figs. 4 and 21) arranged to fit into suitably spaced slots in the two fan flanges. These ears are notched in order that they may easily be riveted onto the outer surfaces of the flanges to hold the blades securely in position.

The draft tube shown in detail in Figs. 22 to 29, inclusive, is designated as a whole by numeral 850 and comprises three principal sections 851, 852, and 853. Sections 851 and 852 have bottom walls 854 and 855, respectively, which project inwardly from side walls 856 and 857, respectively. These bottom walls 854 and 855 are scalloped as is shown in Fig. 22 to fit around the cylinder fins, and these bottom walls support skirt members 858 and 859, respectively, and have flared lower edge portions 860 and 861. It will be noted in Figs. 2, 3, and 4, that these skirts 858 and 859 extend about half way down the length of the cylinder fins. The wall 856 of member 851 supports a fixed tapered draft tube portion 862 which cooperates with a movable tapered draft tube portion 853 to provide an enclosure for the engine superstructure and valve mechanism and to provide a tube for conducting the cooling air to the engine fan. Cover 853 is hinged at 863 so that the cover may be swung to one side as shown in Fig. 25 to give access to the top portion of the engine for inspection, adjustment, and replacement of parts, should this be necessary. When in position, the cover 853 is secured by means of buckle members 864. At the forward end of the draft tube 850, the parts 860, 862, 853, and 861, provide a substantially continuous circular reinforcing bead which is adapted to fit over the flange 814 of fan spider 813.

The wall 856 is provided with a series of equally spaced holes 865. A dowel sleeve 866 (see Fig. 12) passes through each of the holes 865 and one end of each sleeve fits within a counterbored recess 867 provided in the outer end of each of the exhaust and inlet passages of the superstructure 250. Each of the sleeves 866 is adapted to fit within a similar counterbored recess formed in the outer end of each of the branch passages of the engine manifold. This construction provides a main support for the draft tube and holds the superstructures in alignment.

The manifold comprises sections 870 and 871. The base portion 870 of the manifold, which is common to both the intake and exhaust gas conduits, has an intake passage leading up from a carburetor which is bolted to the flange 874 as shown in Fig. 2.

When the manifold parts are assembled, the branch passages of the intake and exhaust manifold will be equally spaced and in alignment with the corresponding passages in the engine superstructures 250 and also with the holes 865 provided in the draft tube. A dowel sleeve 866 (Fig. 12) may be used to connect each of the manifold branches with a branch of an engine superstructure. A gasket 887 is provided between draft tube wall 856 and the superstructure and a gasket 888 is provided between the draft tube wall and the branch portion of the manifold assembly. A common means (Fig. 1) secures the manifold assembly and the draft tube portion 851 to the engine superstructures, and this means comprises horizontal bolts 889 supported by the superstructures 250. The two forward bolts 889 cooperate with clamps 890 which bear against suitably spaced lugs formed on the manifold assembly. The rear bolt 889 passes through a hole provided in the manifold section 870.

As stated before, the draft tube 851 is supported directly by the engine superstructure, and this section in turn supports the section 852. The sections 851 and 852 are clamped together at the ends of the engine by clamping wedges 892 and 893 having upwardly converging inturned flanges (Figs. 26 and 27) which cooperate with complementary outturned flanges shown at 894 and 895 and carried respectively by the skirt portions 860 and 861. The bottom wall 855 of section 852 carries horizontal clips 896 which rest upon the tops of the fins to provide an additional support for draft tube section 852.

The draft tube wall 855 supports a wire conduit 900 which is U-shaped in cross section and includes side flanges 901 and 902 and a bottom portion or web 903. These portions together with the wall 855 cooperate to form a box for enclosing cables leading from the ignition apparatus 447 (Figs. 1 and 31) to the various spark plugs of the engine and also to the ignition switch located on the instrument board of an automobile and a conductor from the generator 803 located at the front end of the engine. The cables from the ignition apparatus enter through a slot 904 in the web 903 and the wire from the generator enters through the hole 905. The front end of the conduit 900 may be closed but the rear end is preferably open to permit wires to be brought out to such apparatus as the ignition coils and the lighting and ignition switch which are located on the instrument board (not shown). The spark plug cables which are housed within the conduit 900 may each extend through one of the holes 906 which are suitably spaced to locate the cables in a convenient manner for attachment to the engine spark plugs. The flange 901 is provided with a plurality of inwardly projecting ears 907 each, provided with a hole 908 so that the conduit 900 may be attached to the wall 855 by bolts 909 and nuts 910.

As shown in Figs. 1, 4, 30 and 31, the engine is enclosed by a hood which includes a front section 920 (Figs. 30 and 31) and hinged side sections 921, 922, 923, and 924, (Fig. 4) the front section 920 being supported by a front cross member 212 of the automobile frame. This front cross member 212 is supported by members 213 and 214 which are secured to spring brackets 208 and 209. Members 213 and 214 support channel members 928 and 929 which are adapted to receive the lower beaded edges of the hood members 921 and 924. Any suitable means may be used for securing the members 921 and 924 in position. The rear wall of the engine enclosure is formed by the automobile dash board 930 (Figs. 30 and 31) which carries an inwardly projecting shield 931 providing a pocket for receiving the clutch and brake pedals when pressed forward. The bottom of the engine enclosure is provided by the oil pan 215 itself and by splash pans 932 and 933 which are supported by side members 213 and 214, respectively, and extend inwardly toward the engine and rest upon the flanges of the oil pan 215.

The front hood section 920 is provided with openings 934 having narrow walls 935 inclined toward the engine (Fig. 31) to obscure a view of the parts under the hood from a point directly in front of the latter, thus adding to the appearance of the apparatus. The front hood section is similar in front elevation to honeycomb radiators but the walls of the openings are relatively narrow to reduce to a minimum the resistance to air currents entering the hood.

The air currents entering the hood in front of the fan are deflected by the latter and take a current path D (Fig. 19) around the fan edge which curved path conforms generally to the reverse path E of the air thrown out by the fan. By this construction the air currents entering the hood are prevented from limiting the effective discharge opening of the fan and a resultant cutting down of the fan capacity. The reverse path taken by the exhaust air is due chiefly to the shape of the fan parts. The general direction of the air currents under the hood produced by movement of the automobile are indicated in Fig. 30 by the arrows 936 and 937. The air currents entering the lower portion of the hood are prevented from passing downwardly under the engine by the splash pans 932 and 933 thus avoiding a partial vacuum and large eddy currents adjacent the lower portions of the rear cylinders. Movement of the vehicle creates a pressure in front of the dash board and around the air inlets at the bases of the rear cylinders. This pressure tends to counterbalance the greater resistance offered by the draft tube to the air which enters the fins on the rear cylinder and travels over a greater path to the fan than the air which enters the fins on the front cylinder.

Due to the high heat conductivity of the copper fins and the good thermal contact of the fins with the cylinder, the amount of cooling air employed may be varied throughout the length of the cylinder. This variation is produced by employing a draft tube skirt whose intake end is intermediate the length of the cylinder fins. The length of the draft tube skirt is determined chiefly by the power required to operate the fan, the relative temperatures of the piston head and cylinder head and the piston construction. Shortening the skirt reduces the resistance to air flow and the power required to drive the fan. This increases the cooling of the cylinder head and decreases the cooling of the cylinder wall. The cooling of the cylinder wall depends in part upon the temperature differential desired between the piston skirt and cylinder wall to cause the heat to flow through the wall between these two members and cool the piston skirt. The rate at which heat is removed from the piston skirt depends on the temperature of the piston head and the quantity of metal employed in conducting heat from the piston head to the piston skirt. The best engine performance is obtained when the piston and cylinder heads are heated to the same temperature. Engines constructed as described have been successfully operated at more than 85 pounds compression on common forms of gasoline without producing a fuel knock. The higher the compression at which an engine is operated, the greater the thermal efficiency of the engine.

Due chiefly to the large cross sectional diameter and shape of the draft tube, the air currents pass through the latter with little if any swirling motion thus lessening the power required to operate the cooling apparatus and increasing its efficiency. The hotter portion of the air, which portion is drawn from over the exhaust side of the engine, is thrown outwardly by the fan away from the cooler air entering the hood and passing to the intake end of the skirts surrounding the cylinders.

The quantity of air moved through the cooling system is substantially in direct proportion to engine speed and, at constant load, the cooling is substantially in the same proportion to the heat generated when the engine is operated at different speeds. This gives uniform engine performance and a better performance at low speeds than has been obtained before in air cooled engines. Since the fan expels the air at low velocity, and since the velocity of the air after it has left the cooling fins is of little importance, the power lost in momentum of the air which has left the fan is reduced to a minimum. Due to the more rapid heating of the engine, when the latter is started in cold weather, and to the better cooling in warm weather than is obtained in water cooled engines, the mileage per gallon of fuel is increased and the tendency to carbonize is decreased. The use of the air cooling means described and including the fins and the means for conducting the air over the fins gives results comparable with the best water cooled engines operating at high compression pressures. When operating at engine compressions in excess of 80 pounds, the engine has been operated over long periods at speeds which give an automobile a velocity of 65 miles an hour without a sticking or freezing of the pistons as is common in air cooled motors used heretofore. The cooling means performs so efficiently that variations in construction, such, for example, as a shortening of the draft tube skirt, may be made to proportion the cooling to the engine construction.

It has been found that the valves may be operated at relatively low temperatures and that sticking, warping, and wearing of valve stems is reduced thus prolonging the life of these parts.

The power unit is relatively light and compact, the power developed is relatively high, and the construction and grouping of the parts gives a rigid construction adapted to modern production methods. The form and manner of assembling the parts reduces initial cost and cost of inspection and repairs.

While the form of mechanism herein shown and described, constitutes a preferred form of embodiment of the present invention, it is to be understood that other forms might be adopted, all coming within the scope of the claims which follow.

What we claim is as follows:

1. In a multiple cylinder internal combustion engine comprising a plurality of pairs of cylinders all secured to and supported by a single crankcase, and each of which cylinders is provided with an inlet and an exhaust port in the head thereof; a plurality of superstructures separate from and arranged above and secured one to each pair of cylinders, and which superstructures are provided each with laterally extending conduits communicating with the ports aforesaid of the pair of cylinders whereby it is supported; a combined inlet and exhaust manifold extending along and secured to the conduits aforesaid of said several superstructures; and heat radiating fins arranged about the cylindrical portion of said cylinders and extending downward from the plane of the heads thereof; said manifold having an inlet leading thereinto and an outlet leading therefrom, and both of which are located at one and the same end of said manifold.

2. In a multiple cylinder internal combustion engine comprising a plurality of pairs of cylinders all secured to and supported by a single crankcase, and each of which cylinders is provided with an inlet and an exhaust port in the head thereof; a plurality of superstructures arranged one above each pair of cylinders, each of said superstructures being provided with three laterally extending conduits one communicating with two ports one in each of the cylinders whereby it is supported, and the other conduits communicating with the other ports in said cylinders; a draft tube extending along the heads of said cylinders and enclosing said super-structures, and having an opening arranged adjacent said heads; a combined intake and exhaust manifold located outside said draft tube and extending along and communicating with all the conduits aforesaid of said superstructures; heat radiating fins associated with and extending longitudinally of said several cylinders, and located below the plane of the heads thereof; and means for inducing a flow of air past said fins and through said draft tube.

3. In a multiple cylinder internal combustion engine having a plurality of cylinders all secured to and supported by a single crankcase, and each of which cylinders is provided with an inlet and an exhaust port in the head thereof; a plurality of superstructures arranged one above each cylinder, and each of which is provided with laterally extending conduits communicating with the ports aforesaid; a draft tube extending along the heads of said cylinders and enclosing said super-structures, and having an opening arranged adjacent said heads; a combined intake and exhaust manifold located outside said draft tube and extending along the same, and having conduits communicating with the conduits aforesaid of said super-structures, the respective adjacent ends of the conduits of said manifold and said super-structures abutting against opposite sides of a wall of said draft tube and serving to support the same, there being holes in said wall through which the combustible mixture supplied to the cylinders and the exhaust gases flowing therefrom may pass; heat radiating fins associated with and extending longitudinally of said several cylinders; and means for inducing a flow of air past said fins and through said draft tube.

4. In a multiple cylinder internal combustion engine, a plurality of cylinders arranged alongside and adjacent one another, and having fins upon their peripheries for effecting the cooling thereof; a draft tube extending along the heads of said cylinders and having an opening arranged adjacent said heads; a fan located at the front end of said draft tube and adapted to induce a flow of air past said fins and through said opening and into and along said draft tube; a hood enclosing the engine and said draft tube and fan, and having a front end located adjacent and in front of said fan and which end is provided with openings through which air may flow into the space enclosed by said hood; and means for providing outlet passages in the sides of said hood through which air may flow from within said hood to the external atmosphere; the arrangement being such that the fan aforesaid discharges directly in the space enclosed by said hood through its entire periphery.

5. In a multiple cylinder internal combustion engine, a plurality of cylinders arranged alongside and adjacent one another, and having fins upon their peripheries for effecting the cooling thereof; a draft tube extending along the heads of said cylinders and having an opening arranged adjacent said heads; a fan located at the front end of said draft tube and adapted to induce a flow of air past said fins and through said opening and into and along said draft tube; and a hood enclosing the engine and said draft tube and fan, and having a front end located adjacent and in front of said fan and which end is provided with openings through which air may flow into the space enclosed by said hood; said hood being closed along its under and rear sides and having openings in its side walls through which air may flow from within the same to the external atmosphere; and said fan being arranged to discharge directly into the space within said hood throughout its entire periphery.

6. In a multiple cylinder internal combustion engine, a plurality of cylinders arranged alongside and adjacent one another; cooling fins extending longitudinally of and arranged substantially radially upon the exterior of each of said cylinders; a draft tube extending along the heads of said cylinders and having an opening arranged adjacent said heads; a skirt extending downward from said opening and enclosing the upper ends of said fins; a hood enclosing the parts aforesaid and a fan located at one end of said draft tube and adapted to induce a flow of air past said fins and through said skirt and opening into and along said draft tube, and which fan discharges directly into the space enclosed by said hood throughout its entire periphery.

7. In a multiple cylinder internal combustion engine, a plurality of cylinders arranged alongside and adjacent one another; cooling fins extending longitudinally of and arranged substantially radially upon the exterior of each of said cylinders; a draft tube extending along the heads of said cylinders and having an opening arranged adjacent said heads; a skirt extending downward from said opening and enclosing the upper ends of said fins, said skirt and draft tube being formed by two similar sections meeting substantially at a central plane extending longitudinally of said cylinders; clamping members at the ends of said skirt portions for fastening them together; and a fan located at one end of said draft tube and adapted to induce a flow of air past said fins and through said skirt and opening and into and along said draft tube.

8. In a multiple cylinder internal combustion engine, a plurality of cylinders arranged alongside and adjacent one another; cooling fins arranged upon the exteriors of said cylinders; a draft tube extending along the heads of said cylinders and having an opening arranged adjacent said heads, and which draft tube is provided with a door section hinged along its lower edge and opening outwardly and downwardly, and which door section extends longitudinally thereof and arranged above said heads, so that access may be had to the interior of said tube and to said heads; and a fan located at one end of said draft tube and adapted to induce a flow of air past said fins and through said opening and into and along said draft tube.

9. In a multiple cylinder internal combustion engine, a plurality of cylinders arranged alongside and adjacent one another; cooling fins arranged upon the exteriors of said cylinders; a draft tube located above and extending along the heads of said cylinders, and having an opening arranged adjacent said heads; and a wire conduit supported by said draft tube and extending along the same, and arranged adjacent the heads of the cylinders aforesaid.

10. In a multiple cylinder internal combustion engine, a plurality of cylinders arranged alongside and adjacent one another; cooling fins arranged upon the exteriors of said cylinders; and a two-part draft tube located above and detachably secured to said fins and extending along the heads of said cylinders, and having an opening adjacent said heads through which air flowing past said fins may enter said draft tube, the two parts of the draft tube being fastened together along vertically arranged joints.

11. In a multiple cylinder internal combustion engine, a plurality of cylinders arranged alongside and adjacent one another; cooling fins arranged upon the exteriors of said cylinders; a draft tube located above and extending along the heads of said cylinders, and having an opening adjacent said heads through which air flowing past said fins may enter said draft tube; and a wire conduit supported by said draft tube and arranged beneath the same, and extending along said tube adjacent the cylinder heads.

12. In a multiple cylinder internal combustion engine, a plurality of cylinders arranged alongside and adjacent one another; cooling fins arranged upon the exteriors of said cylinders; a draft tube extending along the heads of said cylinders and having an opening adjacent said heads; a bearing carrying member supported adjacent one end of the engine and adapted to support one end of said draft tube; a bracket carried by the engine and extending upwardly therefrom; a fan shaft one end of which is supported by a bearing carried by said bearing carrying member, and the other end by a bearing carried by said bracket; and a fan carried by said fan shaft and arranged adjacent the open end of said draft tube.

13. In a multiple cylinder internal combustion engine, a plurality of cylinders arranged alongside and adjacent one another; cooling fins arranged upon the exteriors of said cylinders; a draft tube located above and extending along the heads of said cylinders and having an opening in its under side and adjacent said heads; a spider supported from the upper end of the engine and located within the open end of said draft tube; a bracket carried by the engine and extending upwardly from the lower end thereof; a fan shaft one end of which is supported by a bearing carried by said spider, and the other end by a bearing carried by said bracket; and a fan carried by said fan shaft and arranged between said bearings and adjacent the open end of said draft tube.

In testimony whereof we hereto affix our signatures.

CHARLES F. KETTERING.
CHARLES R. SHORT.